US008169992B2

(12) United States Patent
Parkvall et al.

(10) Patent No.: US 8,169,992 B2
(45) Date of Patent: May 1, 2012

(54) UPLINK SCRAMBLING DURING RANDOM ACCESS

(75) Inventors: Stefan Parkvall, Stockholm (SE); Erik Dahlman, Bromma (SE); Tobias Tynderfeldt, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 927 days.

(21) Appl. No.: 11/835,782

(22) Filed: Aug. 8, 2007

(65) Prior Publication Data

US 2009/0041240 A1    Feb. 12, 2009

(51) Int. Cl.
H04B 7/216    (2006.01)

(52) U.S. Cl. ........ 370/342; 370/335; 370/345; 370/350; 455/436; 455/522

(58) Field of Classification Search .................. 370/329, 370/331, 335, 342; 455/436, 522
See application file for complete search history.

(56) References Cited

U.S. PATENT DOCUMENTS

| 6,724,813 | B1 * | 4/2004 | Jamal et al. ..................... 375/219 |
| 6,958,989 | B1 * | 10/2005 | Dick et al. ..................... 370/342 |
| 7,120,132 | B2 * | 10/2006 | Choi et al. ..................... 370/324 |
| 2002/0041578 | A1 * | 4/2002 | Kim et al. ..................... 370/335 |
| 2002/0071480 | A1 * | 6/2002 | Marjelund et al. ............. 375/141 |
| 2003/0095528 | A1 * | 5/2003 | Halton et al. ................. 370/342 |
| 2004/0131029 | A1 * | 7/2004 | Tobe et al. ..................... 370/331 |
| 2005/0271025 | A1 | 12/2005 | Guethaus et al. |
| 2006/0239239 | A1 * | 10/2006 | Yang ............................. 370/342 |
| 2007/0171889 | A1 * | 7/2007 | Kwon et al. ................... 370/350 |
| 2008/0019306 | A1 * | 1/2008 | Damnjanovic ................ 370/329 |
| 2008/0192766 | A1 * | 8/2008 | Ranta-Aho et al. ........... 370/445 |
| 2008/0207196 | A1 * | 8/2008 | Pettersson ..................... 455/424 |
| 2008/0232317 | A1 * | 9/2008 | Jen ................................. 370/329 |
| 2008/0233960 | A1 * | 9/2008 | Kangude et al. .............. 455/436 |
| 2008/0233992 | A1 * | 9/2008 | Oteri et al. ..................... 455/522 |
| 2009/0252125 | A1 * | 10/2009 | Vujcic ........................... 370/336 |

FOREIGN PATENT DOCUMENTS

| EP | 0565507 | 10/1993 |
| EP | 1146762 | 10/2001 |

OTHER PUBLICATIONS

Dahlman, *3G Long-Term Evolution*, Expert Radio Access Technologies, Ericsson Research, 2005, pp. 1-36.
*3GPP 36.300 CR Draft*, 3GPP TSG-RAN2 Meeting #58bis, Orlando, USA, Jun. 25-29, 2007, pp. 1-91.
International Search Report mailed Dec. 18, 2008 in corresponding PCT Application PCT/SE2008/050832.

* cited by examiner

*Primary Examiner* — Ricky Ngo
*Assistant Examiner* — Rasheed Gidado
(74) *Attorney, Agent, or Firm* — Nixon & Vanderhye P.C.

(57) ABSTRACT

The technology described in this case facilitates random access by a user terminal with a radio base station. A user terminal determines one of a first type of uplink scrambling sequences and generates a random access message using the determined one of the first type of uplink scrambling sequences. The random access message is transmitted to the base station. The user terminal receives from the base station a second, different type of uplink scrambling sequence and uses it for subsequent communication with the radio base station. For example, the first uplink scrambling sequences may be specifically associated with the radio base station's cell area or a random access radio channel associated with the radio base station, but they are not specifically assigned to any user terminal, and the second uplink scrambling sequence may be selected from a second set of uplink scrambling sequences specifically assignable to individual user terminals.

15 Claims, 8 Drawing Sheets

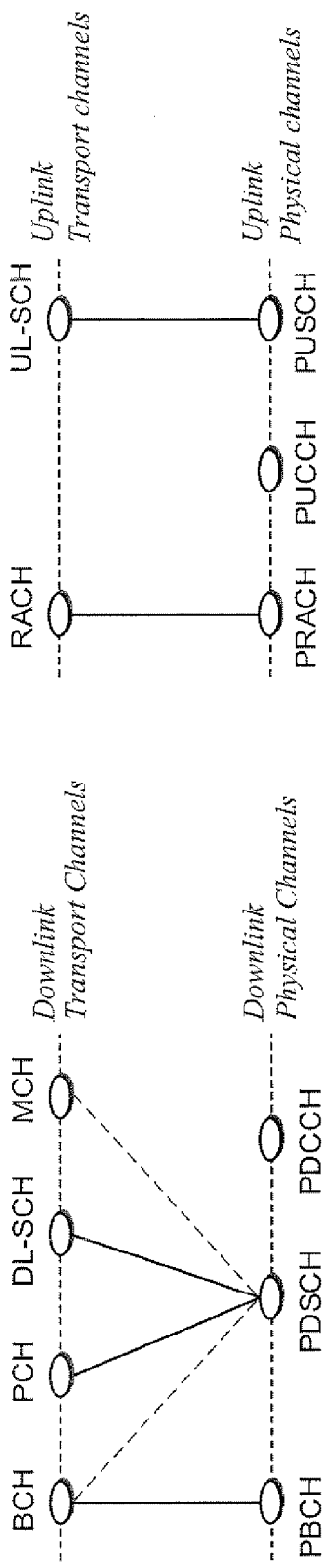
*Figure 5A*
*Figure 5B*
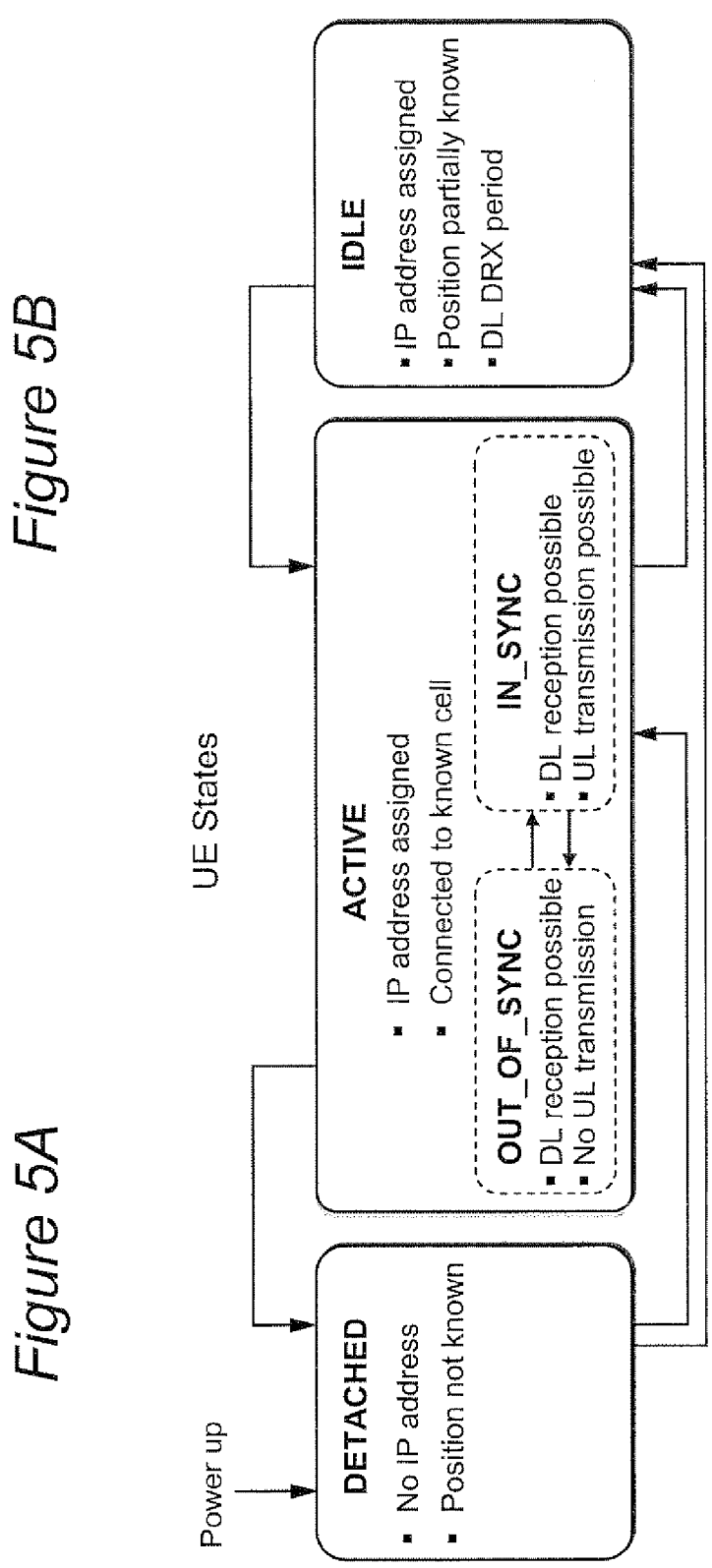
*Figure 6*

UPLINK SCRAMBLING DURING RANDOM ACCESS

TECHNICAL FIELD

The technical field relates to mobile radio communications, and in particular, to uplink communications involving mobile radio terminals in a mobile radio communications system.

BACKGROUND

Universal Mobile Telecommunications System (UMTS) is a 3rd Generation (3G) asynchronous mobile communication system operating in Wideband Code Division Multiple Access (WCDMA) based on European systems, Global System for Mobile communications (GSM) and General Packet Radio Services (GPRS). The Long Term Evolution (LTE) of UMTS is under development by the 3rd Generation Partnership Project (3GPP) which standardized UMTS. There are many technical specifications hosted at the 3GPP website relating to Evolved Universal Terrestrial Radio Access (E-UTRA) and Evolved Universal Terrestrial Radio Access Network (E-UTRAN), e.g., 3GPP TS 36.300. The objective of the LTE work is to develop a framework for the evolution of the 3GPP radio-access technology towards a high-data-rate, low-latency and packet-optimized radio-access technology. In particular, LTE aims to support services provided from the packet switched (PS)-domain. A key goal of the 3GPP LTE technology is to enable high-speed packet communications at or above about 100 Mbps.

FIG. 1 illustrates an example of an LTE type mobile communications system 10. An E-UTRAN 12 includes E-UTRAN NodeB (eNodeBs or eNBs) 18 that provide E-UTRA user plane and control plane protocol terminations towards the user equipment (UE) 20 over a radio interface. Although an eNB is a logical node, often but not necessarily implemented by a physical base station, the term base station is used here to generally cover both logical and physical nodes. A UE is sometimes referred to as a mobile radio terminal and in an idle state monitors system information broadcast by eNBs within range to inform itself about "candidate" base stations in the service area. When a UE needs access to services from a radio access network, it sends a request over a random access channel (RACH) to a suitable eNB, typically an eNB with the most favorable radio conditions. The eNBs are interconnected with each other by means of an X2 interface. The eNBs are also connected by means of the S1 interface to an Evolved Packet Core (EPC) 14 which includes a Mobility Management Entity (MME) by an S1-MME and to a System Architecture Evolution (SAE) Gateway by an S1-U. The MME/SAE Gateway are referenced as a single node 22 in this example. The S1 interface supports a many-to-many relation between MMEs/SAE Gateways and eNBs. The E-UTRAN 12 and EPC 14 together form a Public Land Mobile Network (PLMN). The MMEs/SAE Gateways 22 are connected to directly or indirectly to the Internet 16 and to other networks.

In order to enable operation in different spectrum allocations, for example to have a smooth migration from existing cellular systems to the new high capacity high data rate system in existing radio spectrum, operation in a flexible bandwidth is necessary, e.g., bandwidths ranging from 1.25 MHz to 20 MHz for downlink transmissions from network to UE. Both high rate data services low rate services like voice must be supported, and because 3G LTE is designed for TCP/IP, VoIP will likely be the service carrying speech.

LTE uplink transmission is based on so-called Discrete Fourier Transform Spread-OFDM (DFTS-OFDM) transmission, a low-peak to average power ratio (PAPR), single-carrier (SC) transmission scheme that allows for flexible bandwidth assignment and orthogonal multiple access not only in the time domain but also in the frequency domain. Thus, the LTE uplink transmission scheme is also often referred to as Single-Carrier FDMA (SC-FDMA).

The LTE uplink transport-channel processing is outlined in FIG. 2. A transport block of dynamic size is delivered from the media access control (MAC) layer. A cyclic redundancy code (CRC) to be used for error detection at the base station receiver is calculated for the block and appended thereto. Uplink channel coding is then performed by a channel encoder which may use any suitable coding technique. In LTE, the code may be a turbo code that includes a Quadratic Permutation Polynomial (QPP)-based internal interleaver for performing block interleaving as part of the turbocoder. The LTE uplink hybrid-Automatic Repeat Request (ARQ) extracts, from the block of coded bits delivered by the channel coder, the exact set of bits to be transmitted at each transmission/retransmission instant. A scrambler scrambles the coded bits on the LTE uplink (e.g., bit-level scrambling) in order to randomize the interference and thus ensure that the processing gain provided by the channel code can be fully utilized.

To achieve this randomization of the interference, the uplink scrambling is mobile terminal-specific, i.e., different mobile terminals (UEs) use different scrambling sequences. Terminal-specific scrambling also provides the scheduler the freedom to schedule multiple users on the same time-frequency resource and rely on base station receiver processing to separate the transmissions from the multiple users. Terminal-specific scrambling randomizes the interference from other mobile terminals in the same cell that happen to be scheduled on the same resource and improves the performance.

After scrambling, the data is modulated to transform a block of coded/scrambled bits into a block of complex modulation symbols. The set of modulation schemes supported for the LTE uplink example include QPSK, 16QAM, and 64QAM, corresponding to two, four, and six bits per modulation symbol, respectively. The block of modulation symbols is then applied to a DFTS-OFDM modulator, which also maps the signal to an assigned radio resource, e.g., a frequency sub-band.

Together with the modulated data symbols, the signal mapped to the assigned frequency band also contains demodulation reference signals. Reference signals known in advance by both the mobile terminal (UE) and the base station (eNodeB) and are used by the receiver for channel estimation and demodulation of the data symbols. Different reference signals can be assigned to a user terminal for similar reasons terminal-specific scrambling codes may be used, i.e., to intelligently schedule multiple users on the same time-frequency resource and thereby realize so-called multi-user MIMO. In case of multi-user MIMO, it is up to the eNodeB processing to separate the signals transmitted from the two (or more) UEs simultaneously scheduled on the same frequency resource in the same cell. Terminals simultaneously scheduled on the same frequency resource are typically assigned different (e.g., orthogonal) reference signal sequences in order for the eNodeB to estimate the radio channels to each of those UEs.

A basic requirement for any cellular or other radio communications system is providing a user terminal the capability to request a connection setup. This capability is commonly known as random access and serves two main purposes in LTE, namely, establishment of uplink synchronization with the base station timing and establishment of a unique user terminal identity, e.g., a cell radio network temporary identifier (C-RNTI) in LTE, known to both the network and the user terminal that is used in communications to distinguish the user's communication from other communications.

But during the (initial) random access procedure, uplink transmissions from the user terminal cannot employ terminal-specific scrambling sequences or reference numbers to randomize interference because the initial random access request message from the user terminal has just started communicating with the network and neither a terminal-specific scrambling code nor a terminal-specific reference number has netbeen assigned to that user terminal. What is needed is a mechanism that permits random access messages sent over a shared uplink channel to be scrambled until a terminal-specific scrambling code can be assigned to the user terminal. One reason to scramble random access messages is to randomize inter-cell interference, which is also the case for scrambling during "normal" uplink data transmission. Scrambling can also be used to suppress intra-cell interference in case of multiple UEs being scheduled on the same time-frequency resource. Similarly, it would also be desirable for user terminals to transmit known reference signals during random access to allow the base station receiver to estimate the uplink channel. Reference signals need to be included in the random access messages as well as in "normal" uplink data transmissions to enable channel estimation at the eNodeB and corresponding coherent demodulation.

SUMMARY

The technology described below facilitates random access by a user terminal with a radio base station. A user terminal determines one of a first type of uplink scrambling sequences and generates a random access message using the determined one of the first type of uplink scrambling sequences. Its transmitter transmits the random access message to the radio base station. The user terminal receiver then receives from the base station a second different type of uplink scrambling sequence. The terminal uses that second different type of uplink scrambling sequence for subsequent communication with the radio base station. In one non-limiting example embodiment, the first type of uplink scrambling sequences may be specifically associated with the radio base station's cell area or a random access radio channel associated with the radio base station, but they are not specifically assigned to any user terminal, and the second different type of uplink scrambling sequence may be selected from a second set of uplink scrambling sequences specifically assignable to user terminals. Using these two different types of scrambling sequences permits user terminals to scramble their uplink signal transmissions even though terminal-specific scrambling codes cannot be used in the uplink during random access by user terminals.

The user terminal transmits a first random access request message including a random access preamble to the radio base station using a random access channel radio resource. A second random access response message is then received from the radio base station indicating a timing change, an identified radio resource, and a temporary user terminal identifier. The terminal adjusts a timing at the user terminal for transmitting signals to the radio base station based on information received in the random access response message, and based on the adjusted timing, transmits a third message corresponding to the generated random access message including the user's full terminal identity to the radio base station over the identified radio resource. The third message is scrambled using the determined one of the first type of uplink scrambling sequence, modulated, and mapped to a radio channel resource. The terminal receives a fourth contention resolution message from the radio base station to complete the random access procedures and normal communications follow.

Various non-limiting embodiments map the first set of uplink scrambling sequences to some other parameter known by the user terminal and the base station. For example, the first set of uplink scrambling sequences may be mapped to corresponding random access preamble sequences. One of the first set of uplink scrambling sequences may then be selected based on the random access preamble included in the first random access request message and the mapping. Another example maps the first set of uplink scrambling sequences to corresponding user terminal identifiers and selects one of the first set of uplink scrambling sequences based on the user terminal identifier included in the second random access response message and the mapping. A third example maps the first set of uplink scrambling sequences to corresponding radio resources used for transmitting the random access request message and selects one of the first set of uplink scrambling sequences based on the random access channel radio resource used to send a first random access request message including a random access preamble to the radio base station and the mapping.

The two type scrambling sequence approach also may be used for reference signals embedded in uplink random access messages sent to the base station which are used by the base station to estimate the uplink channel, e.g., for equalization purposes, etc. One of a first set of uplink reference sequences is selected, e.g., uplink reference sequences specifically associated with a radio base station's cell area or random access channel but which are not specifically assigned to any user terminal. A random access message is generated using the selected one of the first set of uplink scrambling sequences and the selected one of the first set of uplink reference sequences. The user terminal transmits the random access message to the radio base station. Thereafter, the base station informs the user terminal of a second different type of reference sequence to use in subsequent uplink communications, e.g., a reference number assigned specifically to that user terminal.

In one non-limiting example implementation, the user terminal and base station are configured to communicate with a long term evolution (LTE) radio communications network with the user terminal transmitting the first random access request message over a random access channel (RACH) and the third message over an uplink-shared channel (UL-SCH). The user terminal identifier sent by the base station in the second message may be a temporary user terminal identifier used until a radio network terminal identifier (RNTI) is assigned to the user terminal.

BRIEF DESCRIPTION OF THE DRAWINGS

FIGS. 5A and 5B illustrate a mapping between transport and physical channels in the downlink and uplink, respectively;

FIG. 6 is a diagram illustrating three basic states of a user terminal;

DETAILED DESCRIPTION

In the following description, for purposes of explanation and non-limitation, specific details are set forth, such as particular nodes, functional entities, techniques, protocols, standards, etc. in order to provide an understanding of the described technology. In other instances, detailed descriptions of well-known methods, devices, techniques, etc. are omitted so as not to obscure the description with unnecessary detail. Individual function blocks are shown in the figures. Those skilled in the art will appreciate that the functions of those blocks may be implemented using individual hardware circuits, using software programs and data in conjunction with a suitably programmed microprocessor or general purpose computer, using applications specific integrated circuitry (ASIC), programmable logic arrays, and/or using one or more digital signal processors (DSPs).

Figure 1:
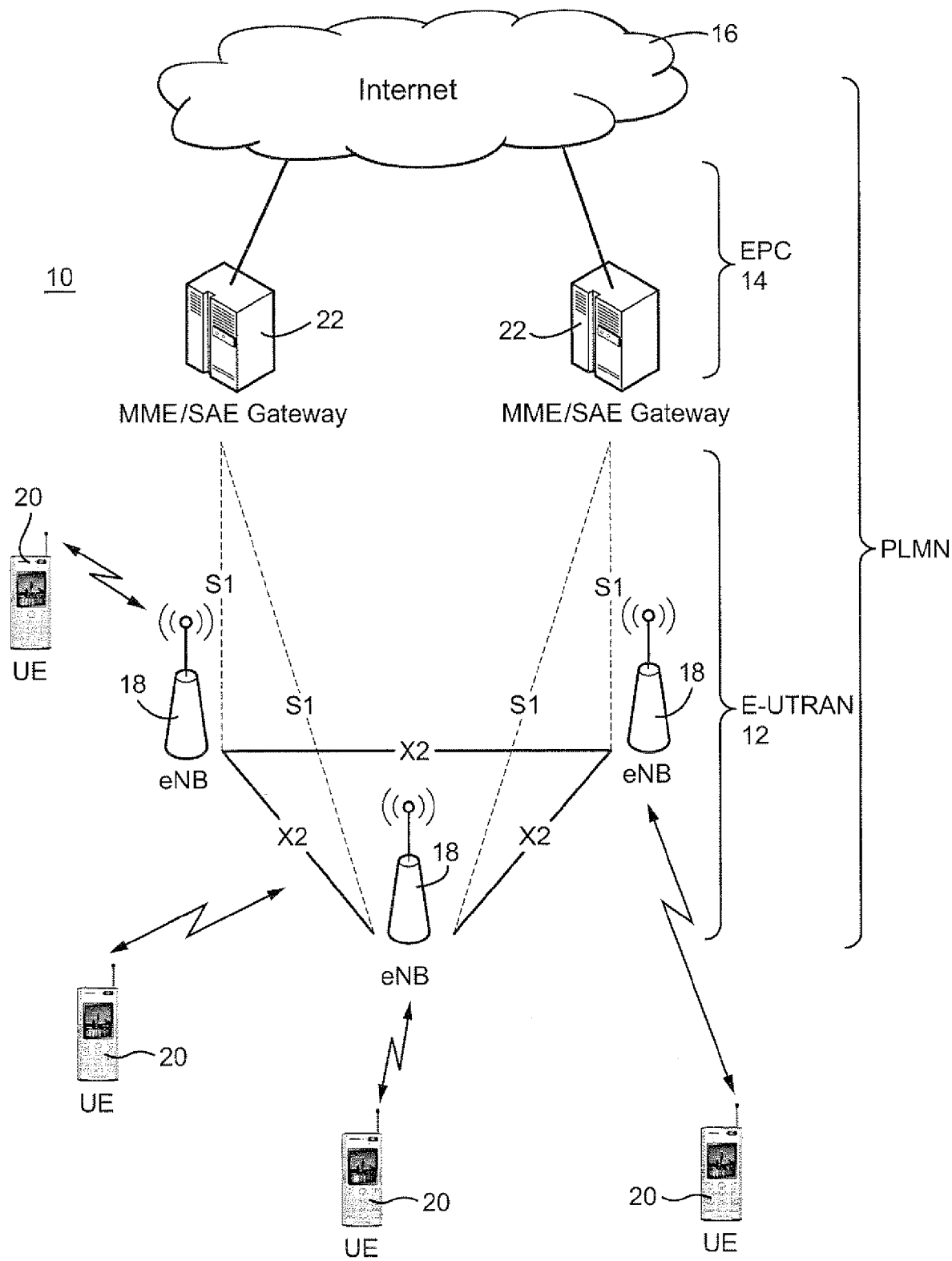
FIG. 1 an example LTE mobile radio communications system.

It will be apparent to one skilled in the art that other embodiments may be practiced apart from the specific details disclosed below. The technology is described in the context of an evolved 3GPP UMTS system such as LTE in order to provide an example and non-limiting context for explanation. See for example the LTE system diagram shown in FIG. 1. But this technology is not limited to LTE and may be used in any modern radio communications system. Moreover, the approach below which employs two different types of scrambling sequences—one for purposes of random access and one for communications after random access is completed—may also be applied to known channel estimation reference signals (sometimes called pilot signals). However, the detailed explanation is provided using scrambling sequences with the understanding that similar details apply to reference signals. For ease of description, a user equipment (UE) is often referred to without limitation as a user terminal or a mobile terminal and an eNodeB is referred to using the more general and familiar term base station.

Figure 3:
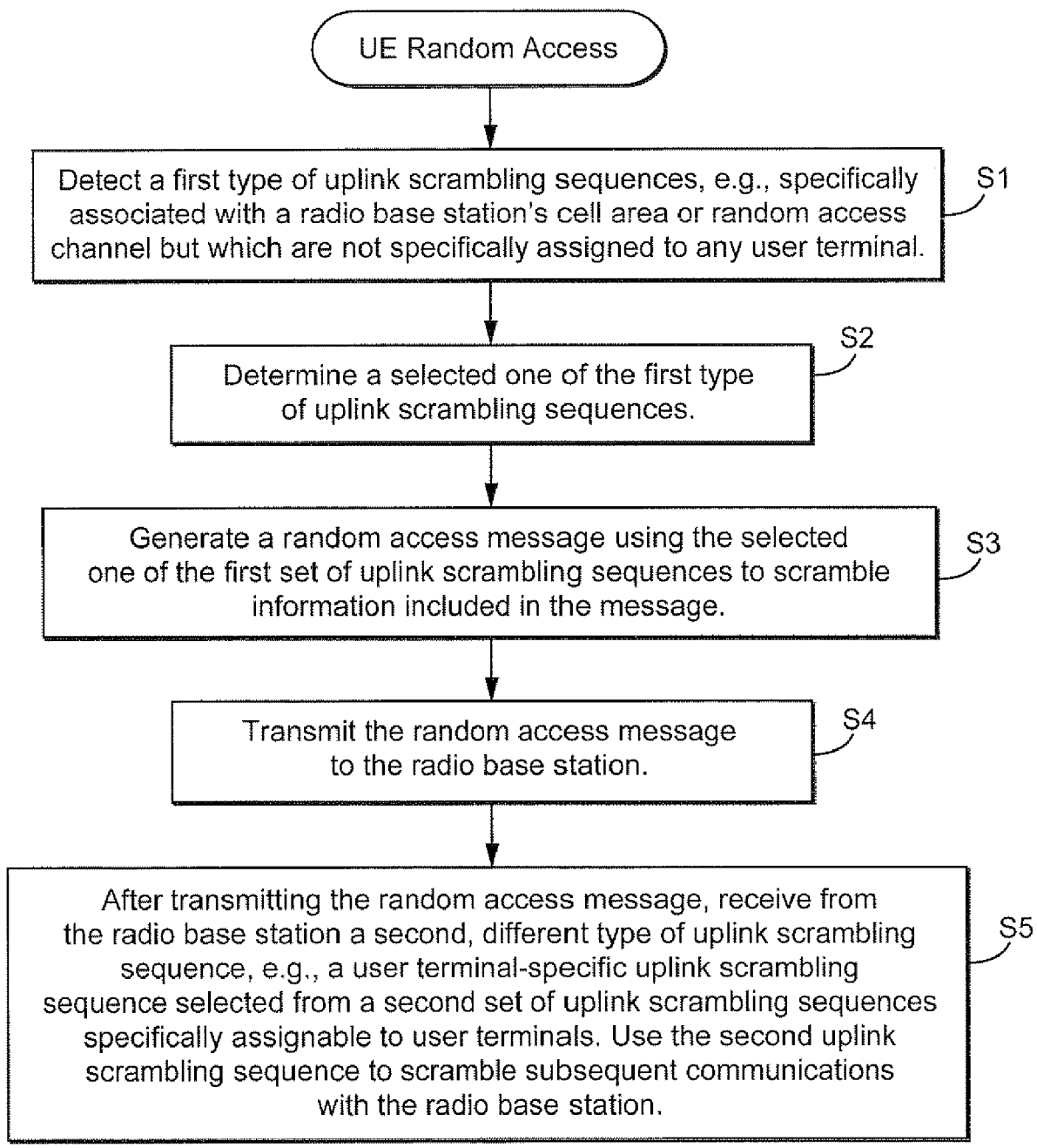
FIG. 3 is flow diagram illustrating non-limiting, example procedures for a user terminal to make a random access to the radio network.

FIG. 3 is flow diagram illustrating non-limiting, example procedures for a user terminal to make a random access to the radio network using an uplink scrambling code that is generally available to all user terminals desiring to randomly access service in a particular cell. The user terminal detects a first type of uplink scrambling sequences, e.g., uplink scrambling sequences specifically associated with a radio base station's cell area or random access channel but which are not specifically assigned to any user terminal (step S1). A selected one of the first type of uplink scrambling sequences is determined (step S2), and a random access message is generated using the selected one of the first type of uplink scrambling sequences (step S3). The user terminal transmits the random access message to the radio base station (step S4). After transmitting the random access message, the user terminal receives from the radio base station a second, different type of uplink scrambling sequence, e.g., an uplink scrambling sequence selected from a second set of uplink scrambling sequences specifically assignable to user terminals (step S5). The user terminal uses the second type of uplink scrambling sequence for subsequent communication with the radio base station. Similar procedures can be used for known uplink reference signals.

Figure 4:
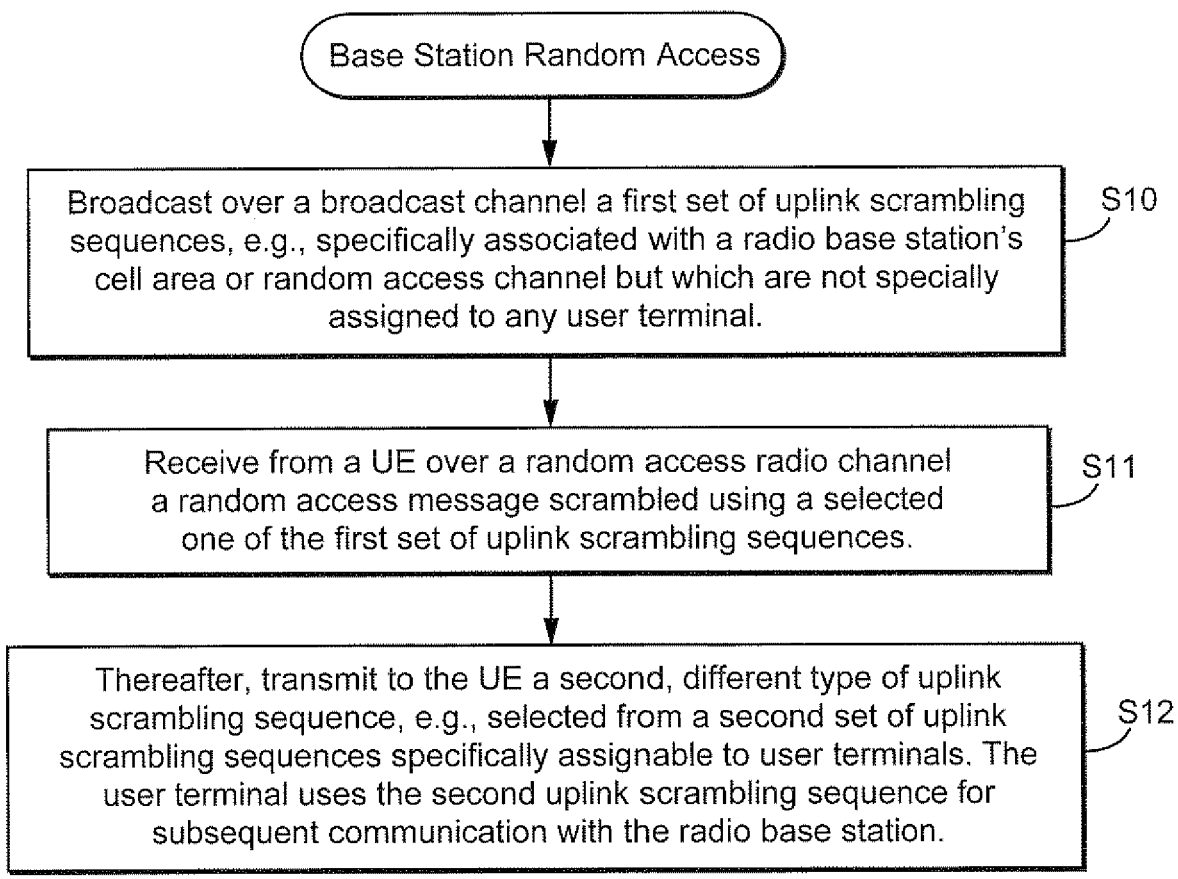
FIG. 4 is flow diagram illustrating non-limiting, example procedures for a base station to receive and process a user terminal's random access to the radio network.

FIG. 4 is flow diagram illustrating non-limiting, example counterpart procedures for a base station to receive and process a user terminal's random access to the radio network. Each base station in the network has its own set of preamble sequences, reference signals, and non-terminal specific scrambling codes or sequences. The base station broadcasts, implicitly or explicitly, over a broadcast channel, e.g., BCH, its set of preambles and uplink scrambling sequences (step S10). If the base station does not explicitly broadcast the scrambling sequence to use, the identity of the cell from which the scrambling sequence to use may be derived for example via a mapping between sequence and cell identifier. The uplink scrambling sequences may be, for example, specifically associated with a radio base station's cell area or random access channel and are not specifically assigned to any user terminal. The base station then waits to receive a first random access request message from a user terminal that includes one of the base station's preambles. In response, the base station transmits a second random access response message to the one user terminal indicating a timing change, an identified radio resource, and a user terminal identifier. A third message corresponding to the generated random access message that includes the user terminal identity is descrambled using the selected one of the first set of uplink scrambling sequences (step S11). Thereafter, the base station transmits to the user terminal a fourth message including a second different type of uplink scrambling sequence selected from a second set of uplink scrambling sequences, e.g., uplink scrambling sequences that are specifically assignable to user terminals (step S12). The user terminal uses the second uplink scrambling sequence for subsequent communication with the radio base station. Similar procedures can be applied for known uplink reference signals.

To better understand the following example and non-limiting LTE random access procedure, reference is made to FIGS. 5A and 5B which illustrate a mapping between transport and physical channels in the downlink and uplink, respectively. The following are downlink transport channels: the broadcast channel (BCH), the paging channel (PCH), the downlink shared channel (DL-SCH), and the multi-cast channel (MCH). The BCH is mapped to the Physical Broadcast Channel (PBCH), and the PCH and the DL-SCH are mapped to the Physical Downlink Shared Channel (PDSH). The uplink transport channels include the random access channel (RACH) and the uplink shared channel (UL-SCH). The RACH maps to the Physical Random Access Channel (PRACH), and the UL-SCH maps to the Physical Uplink Shared Channel (PUSCH).

In LTE, as in other mobile radio communication systems, a mobile terminal can be in several different operational states. FIG. 6 illustrates those states for LTE. At power-up, the mobile terminal enters the LTE_DETACHED state. In this state, the mobile terminal is not known to the network. Before any further communication can take place between the mobile terminal and the network, the mobile terminal needs to register with the network using the random access procedure to enter the LTE_ACTIVE state. The LTE_DETACHED state is mainly a state used at power-up. Once the mobile terminal registers with the network, it is typically in one of the other states: LTE_ACTIVE or LTE_IDLE.

LTE_ACTIVE is the state used when the mobile terminal is active with transmitting and receiving data. In this state, the mobile terminal is connected to a specific cell within the network. One or several Internet Protocol (IP) or other type data packet addresses have been assigned to the mobile terminal, as well as an identity of the terminal, a Cell Radio Network Temporary Identifier (C-RNTI), used for signaling purposes between the mobile terminal and the network. The LTE_ACTIVE state includes two substates, IN_SYNC and OUT_OF_SYNC, depending on whether the uplink is synchronized to the network or not. As long as the uplink is in IN_SYNC, uplink transmissions of user data and lower layer control signaling are possible. If no uplink transmission has taken place within a given time window, the uplink is declared to be out-of-sync, in which case, the mobile terminal must perform a random access procedure to restore uplink synchronization.

LTE_IDLE is a low activity state in which the mobile terminal sleeps most of the time in order to reduce battery consumption. Uplink synchronization is not maintained, and hence, the only uplink transmission activity that may take place is random access to move to LTE_ACTIVE. The mobile terminal keeps its IP address(es) and other internal information in order to rapidly move to LTE_ACTIVE when necessary. The position of the mobile terminal is partially know to the network such that the network knows at least the group of cells in which paging of the mobile terminal is to be done.

Figure 7:
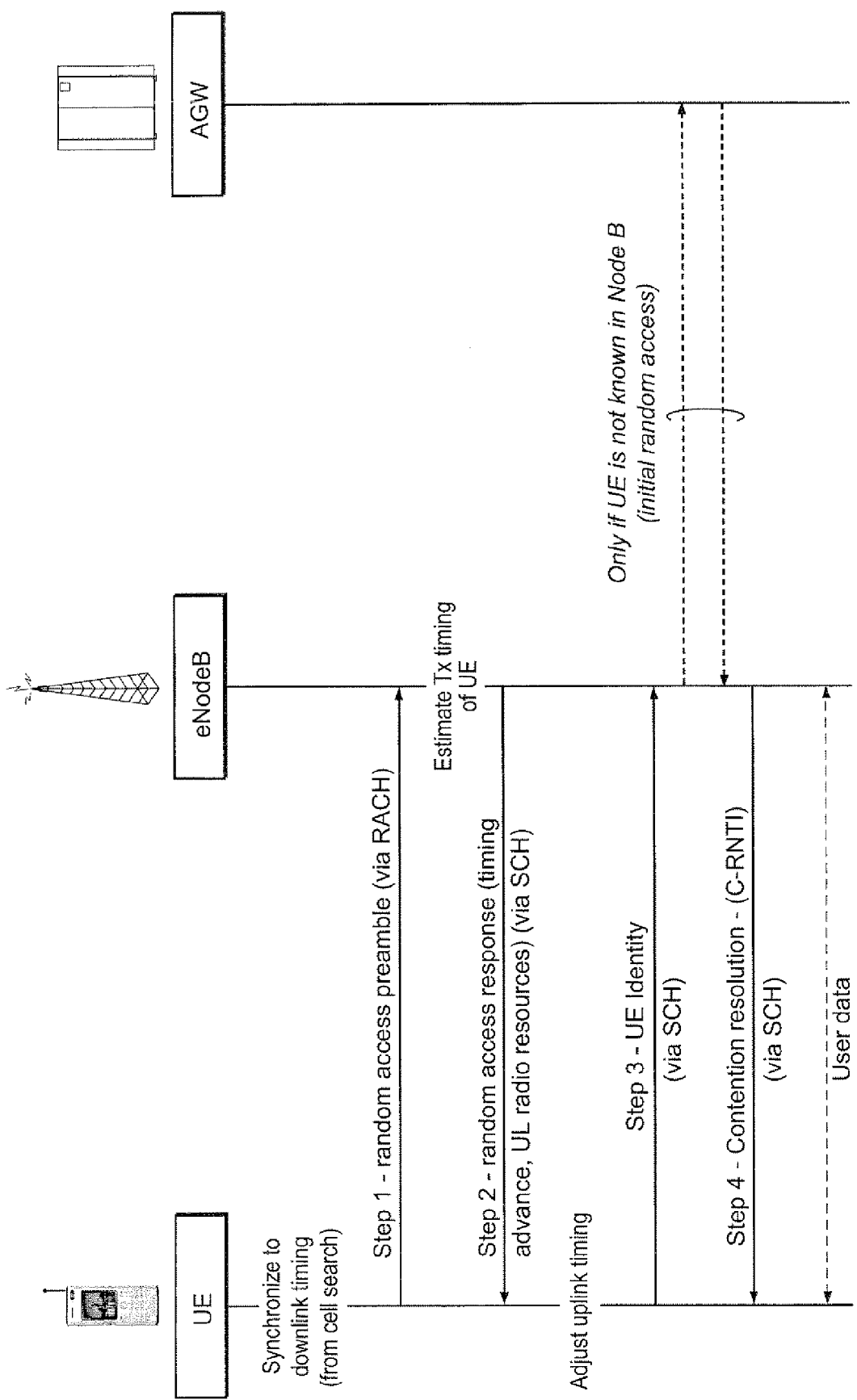
FIG. 7 is a signaling diagram illustrating a non-limiting example random access procedure.

A non-limiting example random access procedure is illustrated in FIG. 7 and includes four steps referred to as steps 1-4 with four associated signaling messages referred to as messages 1-4. The base station transmits a set of preambles associated with that base station, RACH resource information, and other information in a broadcast message sent regularly over a broadcast channel that active mobile terminals regularly scan. In step one, after the user terminal receives and decodes the information broadcast by the base station (eNodeB), selects one of the base station's random access preambles and transmits it over the RACH. The base station monitors the RACH and detects the preamble which allows the base station to estimate the transmission timing of the user terminal. Uplink synchronization is necessary in order to permit the terminal to transmit uplink data to the base station.

The random access preamble includes a known sequence, randomly selected by the mobile terminal from a set of known preamble sequences available for random access purposes with a particular base station. When performing a random access attempt, the terminal selects one preamble sequence at random from the set of preamble sequences allocated to the cell that the terminal is trying to access. As long as no other terminal is performing a random access attempt using the same preamble sequence at the same time instant, no collisions will occur, and the random access request will very likely be detected by the base station. The preamble is transmitted by a user terminal on a radio channel resource, e.g., a time/frequency resource, assigned for random access purposes, e.g., a RACH.

Figure 8:
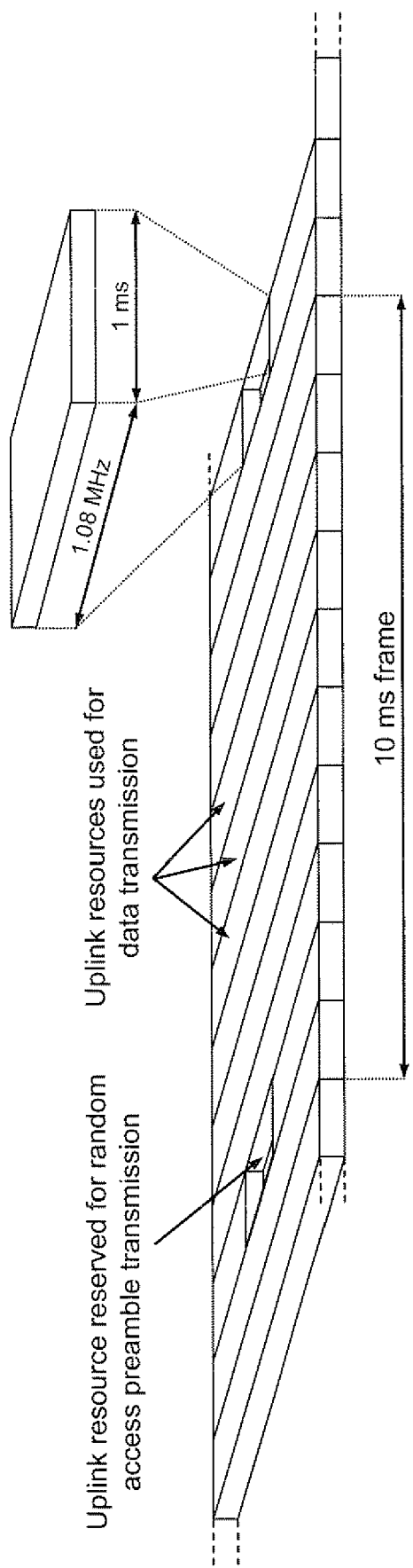
FIG. 8 illustrates a non-limiting example of a random access preamble transmission.
Figure 9:
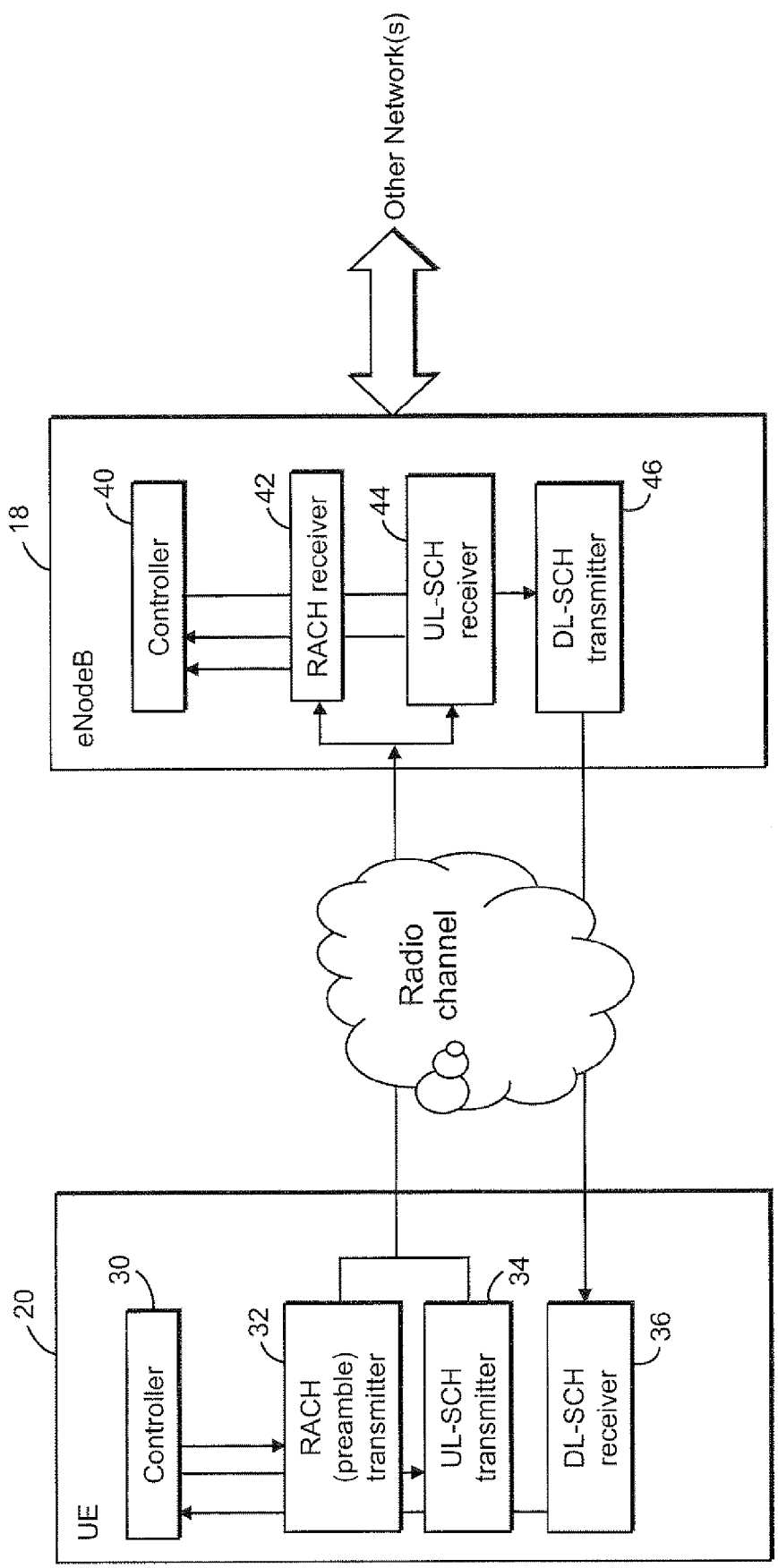
FIG. 9 is a non-limiting, example function block diagram of a user terminal and an eNode B base station.

FIG. 8 illustrates conceptually a random access preamble transmission according to the LTE specification as of this writing. One non-limiting example for generating suitable preambles is based on Zadoff-Chu (ZC) sequences and cyclic shifted sequences thereof. Zadoff-Chu sequences may also be used, for example, to create the uplink reference signals included in each data frame for channel estimation purposes.

A user terminal carrying out a random-access attempt has, prior to the transmission of the preamble, obtained downlink synchronization from a cell search procedure using timing information broadcast by the base station. But as explained above, the uplink timing is not yet established. The start of an uplink transmission frame at the terminal is defined relative to the start of the downlink transmission frame at the terminal. Due to the propagation delay between the base station and the terminal, the uplink transmission will be delayed relative to the downlink transmission timing at the base station. Because the distance between the base station and the terminal is not known, there is an uncertainty in the uplink timing corresponding to twice the distance between the base station and the terminal. To account for this uncertainty and avoid interference with subsequent sub-frames not used for random access, a guard time is used.

Returning to the second random access signaling step shown in FIG. 7, in response to the detected random access attempt, the base station transmits a random access request response message 2 on the downlink-shared channel (DL-SCH). Message 2 contains an index or other identifier of the random access preamble sequence the base station detected and for which the response is valid, an uplink timing correction or timing advance command calculated by the base station after processing the received random-access preamble, a scheduling grant indicating resources the user terminal shall use for the transmission of the message in the third message sent from the mobile terminal to the base station, and a temporary user terminal identity used for further communication between the user terminal and the base station. After step 2 is completed, the user terminal is time synchronized.

If the base station detects multiple random access attempts (from different user terminals), then the random access request response messages 2 to multiple mobile terminals can be combined in a single transmission. Therefore, the random access request response message 2 is scheduled on the DL-SCH and indicated on the Physical Downlink Control Channel (PDCCH) using a common identity reserved for random access response. The PDCCH is a control channel used to inform the terminal if there is data on the DL-SCH intended for that terminal and, if so, on which time-frequency resources to find the DL-SCH. All user terminals that transmitted a preamble monitor the PDCCH for a random access response transmitted using the predefined common identity used by the base station for all random access responses.

In the third step 3, the user terminal transmits the necessary information in message 3 to the network using the scheduled uplink resources assigned in the random access response message 2 and synchronized in the uplink. Transmitting the uplink message in step 3 in the same manner as "normal" scheduled uplink data, i.e., on the UL-SCH, instead of attaching it to the preamble in the first step, is beneficial for several reasons. First, the amount of information transmitted in absence of uplink synchronization should be minimized as the need for large guard time makes such transmissions relatively costly. Secondly, the use of a "normal" uplink transmission scheme for message transmission allows the grant size and modulation scheme to be adjusted to, for example, different radio conditions. Third, it allows for hybrid ARQ with soft combining for the uplink message which may be valuable, especially in coverage limited scenarios, as it allows relying on one or several retransmissions to collect sufficient energy for the uplink signaling to ensure a sufficiently high probability of successful transmission. The mobile terminal transmits its temporary mobile terminal identity, e.g., a temporary C-RNTI, in the third step to the network using the UL-SCH. The exact content of this signaling depends on the state of the terminal, e.g., whether it is previously known to the network or not.

As long as the terminals which performed random access at the same time use different preamble sequences, no collision occurs. But there is a certain probability of contention where multiple terminals use the same random access preamble at the same time. In this case, multiple terminals react to the same downlink response message in step 2 and a collision occurs in step 3. Collision or contention resolution is performed in step 4.

In step 4, a contention-resolution message is transmitted from the base station to the terminal on the DL-SCH. This step resolves the contention in case multiple terminals tried to access the system on the same resource, by identifying which user terminal that was detected in the third step. Multiple terminals performing simultaneous random access attempts using the same preamble sequence in step 1 listen to the same response message in the step 2, and therefore, have the same temporary user terminal identifier. So in step 4, each terminal receiving the downlink message compares the user terminal identity in the message with the user terminal identity they transmitted in the third step. Only a user terminal that observes a match between the identity received in the fourth step and the identity transmitted as part of the third step determines the random access procedure as successful. If the terminal is not yet assigned a C-RNTI, the temporary identity from the second step is promoted to the C-RNTI; otherwise, the user terminal keeps its already-assigned C-RNTI. Terminals which do not find a match with the identity received in the fourth step must restart the random access procedure from the first step.

As explained above, the user terminal identity included in message 3 is used as part of the contention resolution mechanism in the fourth step. Continuing in the LTE non-limiting example, if the user terminal is in the LTE_ACTIVE state, i.e., is connected to a known cell and therefore has a C-RNTI assigned, this C-RNTI is used as the terminal identity in the uplink message. Otherwise, a core network terminal identifier is used, and the base station needs to involve the core network prior to responding to the uplink message in step three.

In this non-limiting LTE example, only the first step uses physical layer processing specifically designed for random access. The last three steps use the same physical layer processing as for "normal" uplink and downlink data transmission, which simplifies the implementation of both the terminal and the base station. Because the transmission scheme used for data transmission is designed to ensure high spectral flexibility and high capacity, it is desirable to benefit from these features also when exchanging random access messages.

Figure 2:
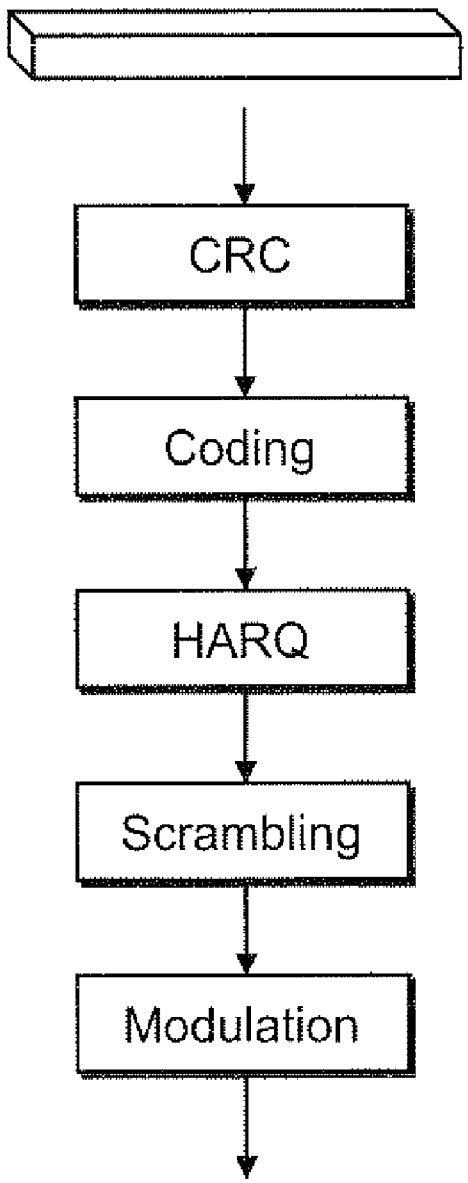
FIG. 2 is a flow diagram illustrating non-limiting, example procedures for preparing a transport block delivered from the media access layer of a user terminal for transmission over the radio interface to the network in an LTE mobile radio communications system.

In the example non-limiting LTE context, the general processing steps described in FIG. 2 including CRC, coding, HARQ, scrambling, modulation, and DFT-S-OFDM modulation are applied by the user terminal to message 3 in FIG. 7 and subsequent uplink transmissions from that user terminal to the base station (there is no scrambling in the initial uplink random access message in step 1). Different uplink scrambling sequences in the terminal depend on the type of uplink transmission. For the random access message 3, a first type of scrambling sequence is used, e.g., a cell-specific or random access channel-specific scrambling code. For subsequent "normal" data transmissions in the uplink, i.e., when the base station has assigned a non-temporary identity to the terminal, a second type of scrambling sequence is used, e.g., a terminal-specific scrambling code. A similar two-type approach may be used for uplink reference signals used by the base station for channel estimation: a first type, e.g., a cell- or random-access-specific reference signal for random access message 3, followed by a second type, e.g., a base station-assigned or associated uplink reference signal sequence for following "normal" data transmissions.

When the base station assigns a scrambling sequence and/or reference sequence to the mobile terminal that terminal-specific scrambling sequence and/or reference sequence is(are) used for all subsequent uplink data transmissions for that particular uplink connection. The scrambling sequence and/or reference sequence to be used can either be explicitly configured in the mobile terminal or tied to the terminal identity (e.g., a C-RNTI) that the base station assigns to a mobile terminal.

In the above, the user terminal uses a cell-specific scrambling sequence to scramble message 3 because prior to performing random access, the user terminal has decoded the base station's/cell's broadcast information and therefore knows the identity of the cell it is accessing, the random access preambles associated with that cell, and cell-specific scrambling sequences and/or reference numbers. As long as multiple terminals performing random access at the same time are assigned different time/frequency resources for their respective uplink random access message 3, there is no interference between these users and the lack of inter-user randomization is not a problem.

In a non-limiting embodiment, a one-to-one mapping is introduced between the random access preamble sequence used in the random access request message sent in step 1 of FIG. 7 and the scrambling sequence used for scrambling the random access message sent in step 3. Because both the base station and the user terminal know the preamble used for the random access request message sent in step 1 by the time message 3 is to be transmitted, both know which scrambling sequence to use.

In another non-limiting embodiment, the base station assigns the scrambling sequence for the user terminal to use for scrambling message 3 as a part of the random access request response transmitted in step 2 of FIG. 7, (i.e., before the transmission of message 3). As one example, this may be done by establishing a one-to-one mapping between the temporary user identifier sent in message 2, e.g., a temporary C-RNTI, and the scrambling sequence to use.

Yet another non-limiting embodiment links the scrambling sequence to be used by the user terminal to scramble message 3 to the time-frequency resource(s) used by the user terminal to transmit the random access preamble (message 1). In this case, the scrambling sequence will be known to both the base station and the user terminal because both know the time-frequency resources used for the first random access request message. For this embodiment, the scrambling sequence will be shared between all user terminals transmitting a random access request preamble on the same time-frequency resource (s). But as long as all those terminals are assigned different time/frequency resources for their own random access message 3, there is no interference between these users and the lack of inter-user randomization is not a problem.

Combinations of one or more of the four different example embodiments may also be used. Again, the principles described in the above scrambling sequence example and the four embodiments may also be used to uplink reference numbers used for uplink channel estimation. In other words, one general or shared type of reference number may be used for uplink random access message 3, and another terminal specific type reference number may be used for subsequent uplink communications associated with the connection.

There may be situations when the user terminal already has been assigned a identity but will still need to perform a random access. One example is when the terminal registers with the network, but loses synchronization in the uplink, and consequently, needs to perform a random access attempt to regain uplink synchronization. Although the user terminal has an identity assigned, terminal-specific scrambling cannot be used for message 3 in this case as the network does not know why the terminal is performing the random access attempt until message 3 is received. As a result, a cell-associated scrambling sequence rather than an outdated terminal-specific scrambling sequence needs to be used.

Accordingly, the benefits of terminal-specific scrambling for normal data transmission are kept without impacting the functionality of the random access procedure. As described above, terminal-specific scrambling randomizes interference which improves uplink transmission performance and provides additional flexibility in the scheduling design.

Although various embodiments have been shown and described in detail, the claims are not limited to any particular embodiment or example. For example, although primarily described in terms of scrambling sequences, the two type approach described for random access scrambling sequences may also be used for determining reference signal sequences sent in each uplink frame which are used by the base station receiver for uplink channel estimation purposes. None of the above description should be read as implying that any particular element, step, range, or function is essential such that it must be included in the claims scope. The scope of patented subject matter is defined only by the claims. The extent of legal protection is defined by the words recited in the allowed claims and their equivalents. All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. No claim is intended to invoke paragraph 6 of 35 USC §112 unless the words "means for" or "step for" are used. Furthermore, no embodiment, feature, component, or step in this specification is intended to be dedicated to the public regardless of whether the embodiment, feature, component, or step is recited in the claims.

The invention claimed is:

1. A method implemented in a user terminal for accessing a radio channel, comprising:
    sending a first message corresponding to a random access request message including a random access preamble to a radio base station associated with a cell using a random access channel radio resource;
    receiving a second message corresponding to a random access response message from the radio base station indicating a timing change, an identified radio resource, and a user terminal identifier indicating a scrambling sequence from a first set of uplink scrambling sequences that are not specifically assigned to a user terminal;
    selecting one of the first set of uplink scrambling sequences based on the user terminal identifier included in the second message corresponding to the random access response message;
    adjusting a timing at the user terminal for transmitting signals to the radio base station based on information received in the random access response message;
    based on the adjusted timing, transmitting a third message corresponding to a scheduled uplink transmission including a user terminal identity specific to the user terminal at least within the cell to the radio base station over the identified radio resource, wherein the third message is scrambled using the selected one of the first set of uplink scrambling sequences; and
    receiving a fourth message corresponding to a contention resolution message from the radio base station.

2. The method in claim 1, further comprising:
    after sending the first message, receiving from the radio base station a user terminal-specific uplink scrambling sequence selected from a second set of uplink scrambling sequences specifically assignable to user terminals,
    wherein the user terminal uses the selected user terminal-specific uplink scrambling sequence for subsequent communication with the radio base station.

3. The method in claim 1, wherein the first set of uplink scrambling sequences are cell-specific scrambling sequences corresponding to athe cell associated with the radio base station.

4. The method in claim 1, wherein the first set of uplink scrambling sequences are mapped to corresponding user terminal identifiers, and the method further comprises:
    selecting the one of the first set of uplink scrambling sequences based on the mapping.

5. The method in claim 1, further comprising:
    selecting one of a first set of uplink reference sequences specifically associated with a cell area or a random access channel associated with the radio base station but which are not specifically assigned to any user terminal;
    generating the third message using the selected one of the first set of uplink scrambling sequences and the selected one of the first set of uplink reference sequences; and
    transmitting the third message to the radio base station.

6. A method implemented in a base station associated with a cell for responding to user terminals requesting service from the base station over a radio channel, comprising:
    receiving a first message corresponding to a random access request message from a user terminal including a random access preamble using a random access channel radio resource;
    transmitting a second message corresponding to a random access response message to the user terminal indicating a timing change, an identified radio resource, and a user terminal identifier indicating a scrambling sequence from a set of uplink scrambling sequences that are not specifically assigned to a user terminal;
    receiving over the identified radio resource a third message corresponding to a scheduled uplink transmission from the user terminal including a user terminal identity specific to the user terminal at least within the cell, wherein the random access message is scrambled using one of the set of uplink scrambling sequences selected using the user terminal identifier; and
    transmitting a fourth message corresponding to a contention resolution message to the user terminal.

7. A user terminal for requesting service from a base station having a cell area where the base station offers radio communications service, comprising:
    a radio transmitter configured to transmit a first message corresponding to a random access request message including a random access preamble to the base station using a random access channel radio resource;
    a radio receiver configured to receive a second message corresponding to a random access response message from the radio base station indicating a timing change, an identified radio resource, and a user terminal identifier indicating a scrambling sequence from a first set of uplink scrambling sequences that are not specifically assigned to a user terminal; and
    electronic processing circuitry configured to select one of the first set of uplink scrambling sequences based on the user terminal identifier included in the random access response message and to adjust a timing at the user terminal for transmitting signals to the base station based on information received in the random access response message;

wherein based on the adjusted timing, the transmitter is configured to transmit a third message to the base station over the identified radio resource, wherein the third message corresponds to a scheduled uplink transmission including a user terminal identity specific to the user terminal at least within the cell area, and wherein the third message is scrambled using the selected one of the first set of uplink scrambling sequences, and wherein the receiver is configured to receive a fourth message corresponding to a contention resolution message from the base station.

8. The user terminal in claim 7, wherein the first set of uplink scrambling sequences are specifically associated with the base station's cell area or random access radio channel but are not specifically assigned to any user terminal, and wherein the electronic processing circuitry is configured to select a second different type of uplink scrambling sequence from a second set of uplink scrambling sequences specifically assignable to user terminals.

9. The user terminal in claim 7, wherein the electronic processing circuitry is configured to:
   map the first set of uplink scrambling sequences to corresponding user terminal identifiers, and
   select the one of the first set of uplink scrambling sequences based on the mapping.

10. The user terminal in claim 7, wherein the electronic processing circuitry is configured to:
    select the one of a first set of uplink reference sequences specifically associated with a radio base station's cell area or random access channel but which are not specifically assigned to any user terminal, and
    generate the third message using the selected one of the first set of uplink scrambling sequences and the selected one of the first set of uplink reference sequences, and
    wherein the transmitter is configured to transmit the third message to the radio base station.

11. The user terminal in claim 7, wherein the user terminal is configured to communicate with a long term evolution (LTE) radio communications network, and the transmitter is configured to transmit the first message over a random access channel (RACH) and the third message over an uplink-shared channel (UL_SCH).

12. The user terminal in claim 11, wherein the user terminal identifier is a temporary user terminal identifier used until a radio network terminal identifier (RNTI) is assigned to the user terminal.

13. A radio base station associated with a cell for responding to user terminals requesting service from the base station over a radio channel, comprising circuitry configured to:
    receive a first message corresponding to a random access request message from the one user terminal including a random access preamble using a random access channel radio resource;
    transmit a second message corresponding to a random access response message to the one user terminal indicating a timing change, an identified radio resource, and a user terminal identifier indicating a scrambling sequence from a first set of uplink scrambling sequences that are not specifically assigned to a user terminal;
    receive over the identified radio resource a third message corresponding to a scheduled uplink transmission from the user terminal including a user terminal identity specific to the user terminal at least within the cell, wherein the third message is scrambled using one of athe set of uplink scrambling sequences selected using the user terminal identifier; and
    transmit a fourth message corresponding to a contention resolution message to the one user terminal.

14. The radio base station in claim 13, wherein the base station is part of a long term evolution (LTE) radio communications network, the first message is received over a random access channel (RACH), and the third message is received over an uplink-shared channel (UL_SCH).

15. The radio base station in claim 14, wherein the user terminal identifier is a temporary user terminal identifier used until a radio network terminal identifier (RNTI) is assigned to the user terminal.

* * * * *

UNITED STATES PATENT AND TRADEMARK OFFICE
CERTIFICATE OF CORRECTION

PATENT NO.        : 8,169,992 B2
APPLICATION NO.   : 11/835782
DATED             : May 1, 2012
INVENTOR(S)       : Parkvall et al.

It is certified that error appears in the above-identified patent and that said Letters Patent is hereby corrected as shown below:

In Column 3, Line 12, after "has" delete "net-".

In Column 5, Line 50, delete "terminal" and insert -- terminal, --, therefor.

In Column 10, Line 2, delete "terminal" and insert -- terminal, --, therefor.

In Column 12, Line 14, in Claim 3, delete "athe" and insert -- the --, therefor.

In Column 14, Line 28, in Claim 13, delete "athe" and insert -- the --, therefor.

Signed and Sealed this
Sixth Day of November, 2012

David J. Kappos
*Director of the United States Patent and Trademark Office*